(12) United States Patent
Aqlan et al.

(10) Patent No.: US 9,880,549 B2
(45) Date of Patent: Jan. 30, 2018

(54) DYNAMIC BATCH SIZE AND INTERNAL TRANSPORTATION

(71) Applicant: International Business Machines Corporation, Armonk, NY (US)

(72) Inventors: Faisal Aqlan, Poughkeepsie, NY (US); Kevin F. Becker, Hyde Park, NY (US); Jason McAllister, Poughkeepsie, NY (US); Anthony G. Tiano, Kingston, NY (US)

(73) Assignee: International Business Machines Corporation, Armonk, NY (US)

(*) Notice: Subject to any disclaimer, the term of this patent is extended or adjusted under 35 U.S.C. 154(b) by 537 days.

(21) Appl. No.: 14/541,632

(22) Filed: Nov. 14, 2014

(65) Prior Publication Data

US 2016/0139592 A1 May 19, 2016

(51) Int. Cl.
  *G06F 19/00* (2011.01)
  *G05B 19/418* (2006.01)

(52) U.S. Cl.
  CPC ........... *G05B 19/41865* (2013.01); *G05B 2219/39167* (2013.01); *Y02P 90/20* (2015.11); *Y02P 90/28* (2015.11)

(58) Field of Classification Search
  None
  See application file for complete search history.

(56) References Cited

U.S. PATENT DOCUMENTS

| | | | | |
|---|---|---|---|---|
| 5,278,750 A * | 1/1994 | Kaneko | .............. | G06Q 10/06 235/376 |
| 5,359,524 A | 10/1994 | Rohan | | |
| 5,841,677 A | 11/1998 | Yang et al. | | |
| 7,043,320 B1 * | 5/2006 | Roumeliotis | ...... | G05B 13/0265 700/100 |
| 7,242,994 B2 * | 7/2007 | Ishibashi | .......... | G05B 19/41865 700/100 |
| 8,280,635 B2 | 10/2012 | Ella et al. | | |
| 8,751,277 B2 * | 6/2014 | Hong | ................ | G06Q 10/087 705/7.12 |
| 2004/0117266 A1 * | 6/2004 | Yen | ...................... | G06Q 10/063 705/7.36 |
| 2006/0149406 A1 * | 7/2006 | Chen | ............... | G05B 19/41865 700/107 |
| 2009/0037012 A1 * | 2/2009 | Weigang | .......... | G05B 19/41865 700/101 |
| 2013/0103607 A1 * | 4/2013 | Knipfer | .............. | G06Q 10/04 705/335 |

(Continued)

OTHER PUBLICATIONS

Veral, Using Production and Transfer Batches in Flowshops under MRP Control, Journal of Operations Management, vol. 12, No. 2, 1995, pp. 89-100.

(Continued)

*Primary Examiner* — Diem Cao
(74) *Attorney, Agent, or Firm* — Lieberman & Brandsdorfer, LLC (57) ABSTRACT

Embodiments of the invention relate to statistical and mathematical optimization techniques to predict completion time of parts and subassemblies in one production line. A real-time visibility of products and work-in-process is produced. Optimization techniques are utilized to allow for dynamic modification of a transportation schedule and/or batch size, thereby reducing transportation costs.

15 Claims, 9 Drawing Sheets

(56) References Cited

U.S. PATENT DOCUMENTS

2013/0297522 A1 11/2013 Prochazka et al.
2014/0019471 A1 1/2014 Linton et al.
2015/0081077 A1* 3/2015 Li .................... G05B 19/41865
                                                              700/100

OTHER PUBLICATIONS

Langevin et al., Transfer Batch Sizing in Flexible Manufacturing Systems, Journal of Manufacturing Systems, vol. 18, No. 2, 1999, pp. 140-151.
Sarker et al, An Optimal Batch Size for a Production system Operating under Periodic Delivery Policy, Computers and Industrial Engineering, vol. 37, No. 1, 1999, pp. 711-730.
Omar et al, An Optimal Batch Size for a Production System under Linearly Increasing Time-Varying Demand Process, Computers and Industrial Engineering, vol. 42, No. 1, 2002, pp. 35-42.
Cao et al, A Reinforcement Learning Approach to Production Planning in the Fabrication/ Fulfillment Manufacturing Process, Proceedings of Winter Simulation Conference, 2003, pp. 1417-1423.
Konak et al, A Dynamic Programming Approach for Batch Sizing in a Multi-Stage Production Process with Random Yields, Applied Mathematics and Computations, vol. 218, No. 4, 2011, pp. 1399-1406.
Yang et al., The Dynamic Transfer Batch-Size Decision for Thin Film Transistor-Liquid Crystal Display Array Manufacturing by Artificial Neural-Network, Computers and Industrial Engineering, vol. 60, No. 4, 2011, pp. 769-776.

* cited by examiner

| Shift | 1st Shift | | | | | | | | | | | | | | | |
|---|---|---|---|---|---|---|---|---|---|---|---|---|---|---|---|---|
| Period | 7:00 AM | 7:30 AM | 8:00 AM | 8:30 AM | 9:00 AM | 9:30 AM | 10:00 AM | 10:30 AM | 11:00 AM | 11:30 AM | 12:00 PM | 12:30 PM | 1:00 PM | 1:30 PM | 2:00 PM | 2:30 PM |
| Decision | | | | | | | | | Y | Y | Y | Y | Y | Y | Y | Y |
| # of SUBs | 0 | 0 | 0 | 0 | 0 | 0 | 0 | 0 | 4 | 4 | 4 | 2 | 4 | 0 | 4 | 4 |

720 / 722 / 724 / 726

| Shift | 2nd Shift | | | | | | | | | | | | | | | |
|---|---|---|---|---|---|---|---|---|---|---|---|---|---|---|---|---|
| Period | 3:00 PM | 3:30 PM | 4:00 PM | 4:30 PM | 5:00 PM | 5:30 PM | 6:00 PM | 6:30 PM | 7:00 PM | 7:30 PM | 8:00 PM | 8:30 PM | 9:00 PM | 9:30 PM | 10:00 PM | 10:30 PM |
| Decision | Y | Y | | | | | | | | | | | | | | |
| # of SUBs | 4 | 3 | 0 | 0 | 0 | 0 | 0 | 0 | 0 | 0 | 0 | 0 | 0 | 0 | 0 | 0 |

730 / 732 / 734 / 736

| Period | Current | Next |
|---|---|---|
| | 11:00 AM | 11:30 AM |
| Decision | Y | Y |
| # of SUBs | 4 | 4 |

---

Daily Request — 740

Home
B002 Bookroom
Administration
Daily Request
Max Batch
Time Weight
Move Weight
Help Last Updated @ 03/30/2013 17:00:17 PM Required fields are marked with an asterisk (*) and must be filled in to complete the form.

* Daily Book Request: 10

---

Max Batch — 750

Home
B002 Bookroom
Administration
Daily Request
Max Batch
Time Weight
Move Weight
Help Last Updated @ 03/21/2013 9:59:37 AM Required fields are marked with an asterisk (*) and must be filled in to complete the form.

* Max Batch: 4

---

Move Weight — 760

Home
B002 Bookroom
Administration
Daily Request
Max Batch
Time Weight
Move Weight
Help Last Updated @ 03/31/2013 4:23:27 PM Successfully Changed move weight: 0.8

Required fields are marked with an asterisk (*) and must be filled in to complete the form.

* Move Weight: 0.8

DYNAMIC BATCH SIZE AND INTERNAL TRANSPORTATION

BACKGROUND

The present invention relates to statistical and mathematical optimization techniques for production of subassemblies. More specifically, the invention relates to an optimization modeling tool that accounts for internal transportation of the subassemblies.

Transportation is a considerable factor in consideration of manufacturing costs. There are two categories associated with transportation costs, including internal and external. Poor planning and lack of visibility and communication lead to transportation waste and affect productivity. There are many causes of transportation waste, including overproduction, poor production planning, lack of communication, and inefficient transportation routes. When processes are not close to each other, parts and/or products need to be transported from one area to another.

In product layout, the product is produced in one production line and no transportation is required. In process layout, two or more production lines are used to build the product and the product has to be transported between lines. Internal transportation of parts and products in manufacturing environments effects productivity, cycle time, quality and inventory. Internal transportation in manufacturing environments is a non-value added activity. Although this identified transportation can be minimized, it cannot be eliminated.

Analytical and simulation models have been developed to solve problems with production and distribution in supply chains. However, these models do not take into account all aspects of product assembly, and as such are limiting. Accordingly, there is a need for a complete and effective product optimization model.

SUMMARY

The invention includes a method, system, and computer program product for optimization of batch size and transportation in association with manufacture of one or more subassemblies.

In one aspect, a method, computer program product, and system are provided for optimization of the production of subassemblies. Cycle time and work in progress are calculated for manufacture of a subassembly, and a quantity of subassemblies ready for ordering are predicted. In addition, the quantity of subassemblies ready for transportation is calculated, including an associated batch size, with the calculated based on the calculated cycle time and work in progress and the predicted order quantity. At least one parameter, including a real-time batch size, for supporting manufacture of the subassemblies is transformed. More specifically, the transformation is employed for meeting a production schedule for an actual ordering quantity of subassemblies ready for transportation. The transformation includes applying the real-time batch size to create formatted internal transportation data for application to a transportation schedule for the actual ordered quantity of subassemblies in real-time.

Other features and advantages of this invention will become apparent from the following detailed description of the presently preferred embodiment(s) of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 1:
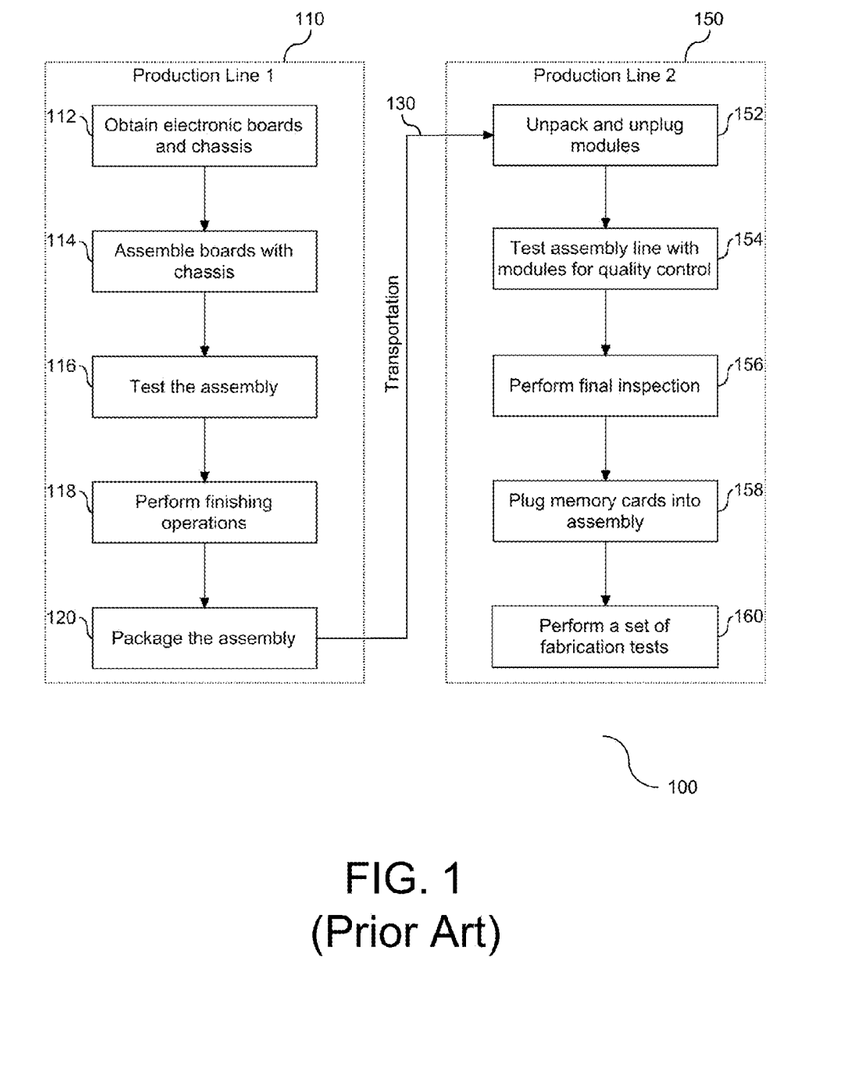
FIG. 1 depicts a flow chart illustrating a prior art process for building a computing node.

A computing node, also referred to herein as a subassembly, is comprised of a plurality of components, including but not limited to, a chassis, a processing unit, memory, etc. The computing node may have a set configuration with a plurality of nodes manufactured with such configurations. It has become known to custom configure computing nodes, which complicates the manufacturing process to meet the demands of custom configuration. Referring to FIG. 1, a flow chart (100) is provided illustrating a prior art process for building a computing node. As shown, there are two production lines (110) and (150). With respect to the first production line (110), electronic boards and chassis are obtained (112) and assembled (114). To support quality control, the assembly is tested (116), after which finishing operations are performed (118) and the assembly is packaged (120). Thereafter, the packaged assembly is transported (130) to the second production line (150). Following arrival at the second line (150), the packaged assembly is unpacked and any modules are plugged in, after which the package is processed through the second production line (152) forming a final assembly. Thereafter, the final assembly with any associated modules is tested for quality control (154), followed by a final inspection thereof (156). Once the final inspection is completed, memory cards are plugged into the assembly (158), and a set of fabrication tests are performed (160).

As shown in FIG. 1, there are two categories associated with the manufacturing process, including assembly and quality control. These two aspects may take place in the same facility or in different facilities. However, regardless of the quantity of facilities employed, quality control does not take place in an associated assembly line for manufacture. There is some form of transportation employed between assembly and testing. Accordingly, the process shown herein illustrates a conventional node building process that employs transportation between two separate production lines.

The process of transporting subassemblies adds a layer of complexity into the manufacturing process. A subassembly manufactured at one location is assembled and packaged for shipment. At the second location, the subassembly is received and placed into a second assembly, which may or may not be a final assembly. Similarly, at one or both locations, the subassemblies may be subject to quality control. Efficiency associated with product assembly requires accommodation of the manufacturing and quality control complexities, as well as transportation costs to effectively schedule receipt of the product.

Figure 2:
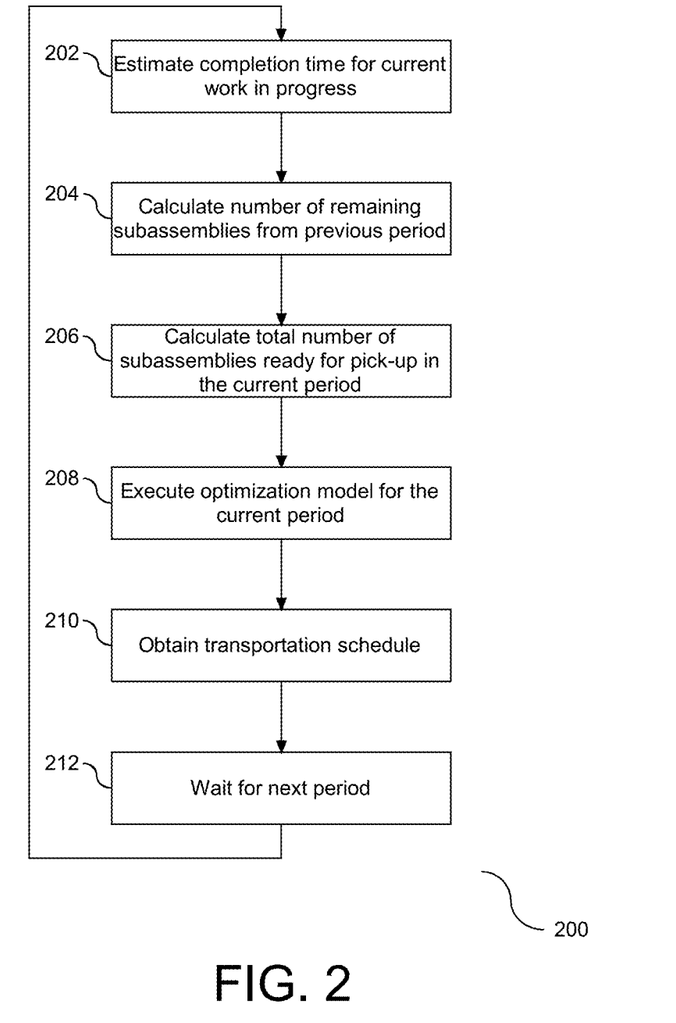
FIG. 2 depicts a flow chart illustrating a forward loop process for implementing an optimization model for use with manufacture.

Referring to FIG. 2, a flow chart (200) is provided illustrating a forward loop process implementing an optimization model for use with manufacture of computing nodes. As shown, a completion time for current work in process is estimated (202). The number of remaining computing nodes, also referred to herein as subassemblies, from the previous period is calculated (204), and the total number of subassemblies ready for pick up in the current period is calculated (206). In one embodiment, the quantity calculated at step (204) is a factor in transportation of the next set of subassemblies. Thereafter, an optimization model for the current period is executed (208), which in one embodiment, accounts for the quantities calculated at steps (204) and (206), respectively, e.g. including subassemblies from both the prior and current time periods. Details of the optimization model and associated functionality are described below. Transportation of the subassemblies is dependent on output from the optimization model. Following step (208), a transportation schedule is obtained (210), after which the process waits for the next period for completion of subassemblies (212) and returns to step (202). Accordingly, the process shown herein illustrates a loop for basing transportation on output from the optimization model.

Figure 3:
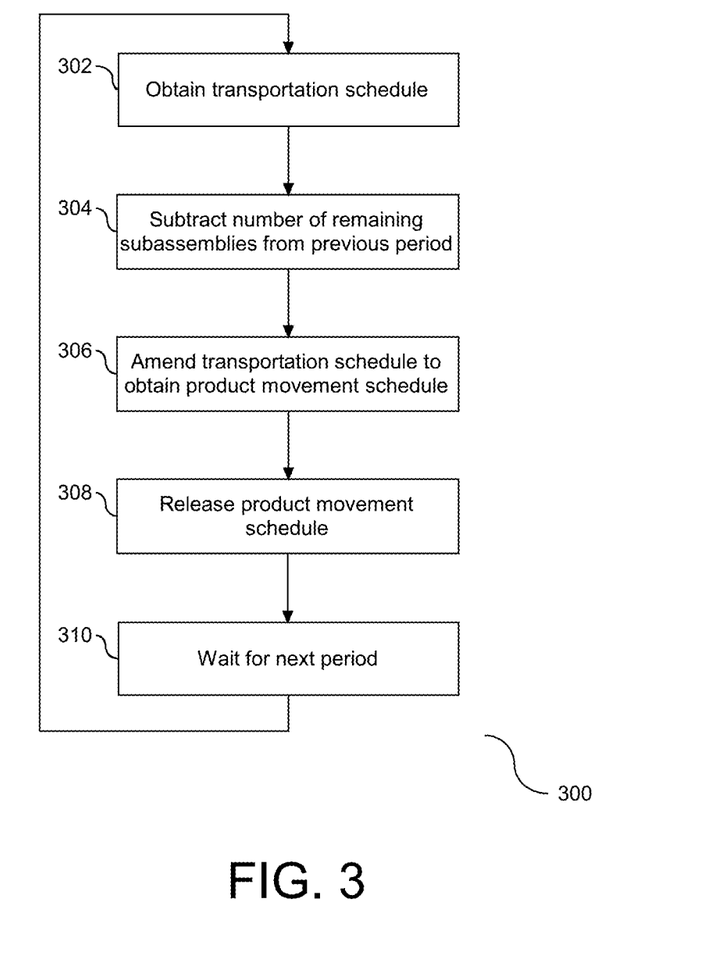
FIG. 3 depicts a flow chart illustrating a backward loop process for transporting subassemblies between two locations.

Referring to FIG. 3, a flow chart (300) is provided illustrating a backward loop process transporting subassemblies between two locations. As shown, a transportation schedule is provided for the current process (302). Thereafter, the number of remaining subassemblies from the previous period is subtracted (304), and the transportation schedule is amended to obtain the product movement schedule (306). The product movement schedule is released (308), after which the process waits for the next period for completion of subassemblies (310) and a return to step (302). According, the process shown herein illustrates a loop for changing the transportation schedule based on product inventory.

Both the forward and backward processes address the complexities of manufacturing that employs some form of transportation within the process, including internal and external transportation factors. More specifically, the forward and backward loops are used to generate transportation schedules within and between production lines and movement schedules within the same production line. There are physical limitations that need to be accommodated. For example, in one embodiment, a forklift vehicle is used to transport the product, and each forklift has a defined capacity. At the same time, in one embodiment, there may be a physical space limitation that restricts the quantity of product that may be moved based on capacity.

Figure 4:
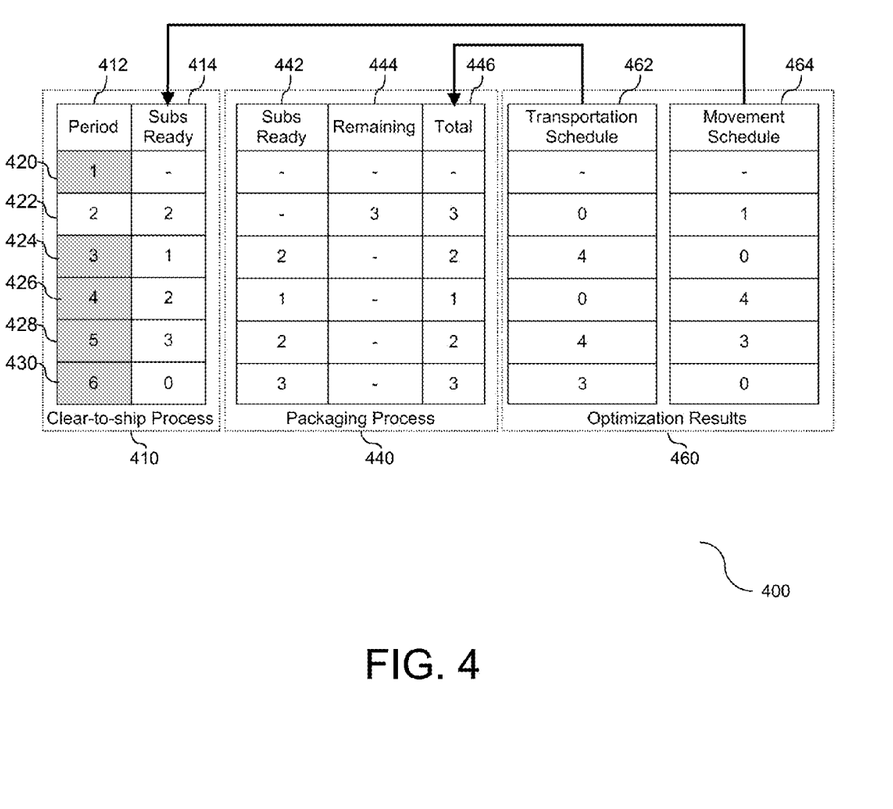
FIG. 4 depicts a block diagram illustrating both the transportation schedule and movement schedule.

Referring to FIG. 4, a block diagram (400) is provided illustrating an example of both the transportation schedule and movement schedule, as shown and described in FIGS. 2 and 3, respectively. As shown, there are three primary aspects to the schedules, including a clear-to-ship process (410), a packaging process (440), and optimization of results (460). The clear-to-ship process (410) represents completed parts that are ready for packaging. In one embodiment, the clear-to-ship process (410) represents the first part of the process, with the products ready for transport to the second part of the process. As shown, the time of day is represented by multiple time slots (412) and subassemblies that are ready for packaging (414). In the example shown herein, there are six time slots (420)-(430), although this quantity should not be considered limiting. As shown in this example, following the first time slot (420), there are no subassemblies ready for packaging from a prior time slot. In one embodiment, there may be subassemblies accounted for in the first time slot, for example, in the situation where there are subassemblies remaining from the prior day. As shown, as the time of day progresses, manufacture continues and products are assembled. In the example shown herein, subassemblies are produced and ready for packaging in each of the second, third, fourth, and fifth time slots. The quantity of subassemblies identified herein is exemplary, and is not considered limiting.

Once the subassemblies are completed, they are packaged individually or in multiple quantities. The packaging process (440) identifies subassemblies that are ready for packaging (442), the quantity of packages that remain from the prior time slot (444), and the total (446) representing a combination of the subassemblies ready for packaging and the packages remaining from the prior time slot. The packaging process is followed by optimization (460) where the subassemblies that are prepared and ready are scheduled for transportation (462) to a receiving location and/or scheduled for movement from the final assembly location (464). In the example shown herein, the maximum quantity of packages that may be accommodated during transport is four, although in one embodiment this quantity may vary. Furthermore, as shown in this example, in the second time slot (466), there are three subassemblies ready for optimization, only one of which is subject to movement (468). In the following time slot, any remaining subassemblies are aggregated with the next set of ready subassemblies, and are subject to transportation and/or movement. Accordingly, the multi-step process shown herein organizes and facilitates transportation and movement of packaged subassemblies.

Figure 5:
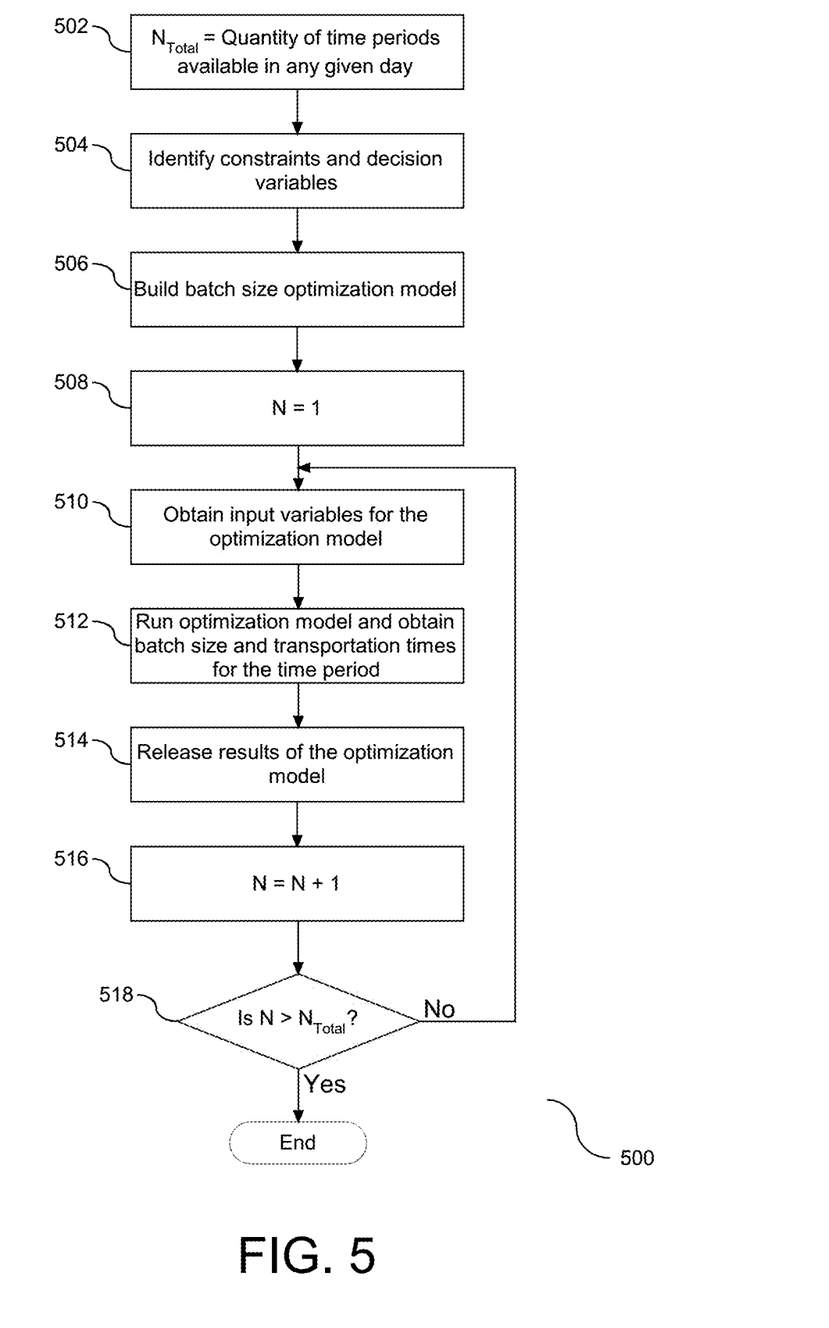
FIG. 5 depicts a flow chart illustrating a process for implementing a transportation schedule for the package subassembly.

When the subassembly packaging is completed, the subassembly is ready for transport. This transport is from an internal or external location, and is prior to the completion of the multi-step assembly process. For example, if manufacture is local and contained within a single facility, the transport is internal. However, the manufacture requires at least two assembly phases with the phases at two separate physical locations, transportation is remote and thereby requires external transportation. Referring to FIG. 5, a flow chart (500) is provided illustrating a process for implementing a transportation schedule for the package subassembly. As described below and depicted in FIG. 4, the day is separated into multiple time periods, with the variable $N_{Total}$ representing the quantity of time periods available in any given day (502). A time period generally represents a set period of time, such as 30 minutes, 60 minutes, etc. In addition, constraints and decision variables are identified (504). These variables include, but are not limited to, available space and a maximum batch size, which in one embodiment may be limited based on the maximum quantity of units a forklift can manage within the defined time slot.

In addition to the identification of constraints at step (504), a batch size optimization model is built (506). In one embodiment, this model addresses the maximum number of products that can be transported in a single move. The optimization model, as referenced above in FIG. 2 is an objective function to maximize transport of products while minimizing the quantity of moves. Following the initialization at steps (502)-(506), the time period counting variable is initialized (508) and input variables for the optimization model for an identified period in the day are obtained (510). In one embodiment, each period is identified with the variable N. Based on the input variables, the optimization model is run and the batch size and transportation times for the time period are obtained (512). The results of the optimization model are released (514). In one embodiment, the results are released to a central location, also referred to herein as a dashboard. Following step (514), the time period variable N is incremented (516) and it is determined if the optimization model has been processed for each time period (518). If there are remaining time periods to be assessed, the process returns to step (510) to run the optimization model for the next period. However, if all of the time periods have been assessed then the transportation schedule is completed.

With respect to FIGS. 2 and 5, an optimization model is referenced. The optimization model is formulated as follows:

$$MinZ = w_1 \sum_{t=1}^{T} \min\left(1, \sum_{i=1}^{M} X_t^i\right) + w_2 \sum_{t=1}^{T} W_t$$

The optimization model is an objective function, with the goal of considering one move of a product on a transport, e.g. forklift. The variable $X_{i,t}$ referenced in the model refers to the number of product type i that should be transported per move at time period t. In one embodiment, this variable is referred to as a dynamic batch size. The variable $W_t$ referenced in the model refers to a weighted waiting time for parts of a subassembly, also referred to herein as nodes, for transport at time period t. Both of the variables identified in the model have an associated weight. A weight for transportation cost, $w_1$, is assigned to the variable $X_{i,t}$, and a weight for waiting time, $w_2$, is assigned to the weighted waiting time variable $W_t$. At the same time, the model is subject to the following constraints:

$$\sum_{i=1}^{M} X_t^i \leq B; t = 1, 2, \cdots, T,$$

wherein B represents the maximum number of products that can be transported in one move, also referred to herein as a maximum batch size, and T represents a set of time periods indexed by t;

$$\sum_{t=1}^{T} X_t^i \leq \min(O^i, N^i); \forall i \in M,$$

wherein O represents daily requests from a manager, N represents an expected number of subassemblies ready for pickup at period t, and M represents a set of product types;

$$A_t = A_{t-1} + \sum_{i=1}^{M} (N_t^i - X_t^i); t = 1, 3, \cdots, T,$$

wherein A(t) represents an accumulated number of products ready for pickup at time t from a prior period;

$$A_t \leq C; t=1,2,\ldots,T,$$

wherein C represents storage capacity, since the quantity of accumulated products cannot exceed the storage space available;

$$W_t = L_{t-1} A_{t-1} + \sum_{j=1}^{Y} (L_t - r_j); t = 1, 2, \cdots, T; v_t \leq r_j < v_{t+1}$$

wherein $W_t$ represents the accumulated waiting time, and the variables $L_t$ represents the length of a single period t, based on the assumption that all periods have the same length, the variable A represents the accumulated number of products ready for pick up at time t, the variable $r_j$ represents the time when product j is finished and ready for pick up, and the variable $v_t$ represents the real time of period t. The difference in the summation component represents the time difference associated with waiting to transport from a first line to a second line, etc.;

$$Y = \sum_{i=1}^{M} \min(O^i, N^i),$$

wherein Y represents the total number of parts to be moved; and $$A_0=0,$$

representing that at the initial time period there is no accumulation of parts ready for pick up, and that at any subsequent time period there is at least one part accumulated and ready for pick up.

Figure 6:
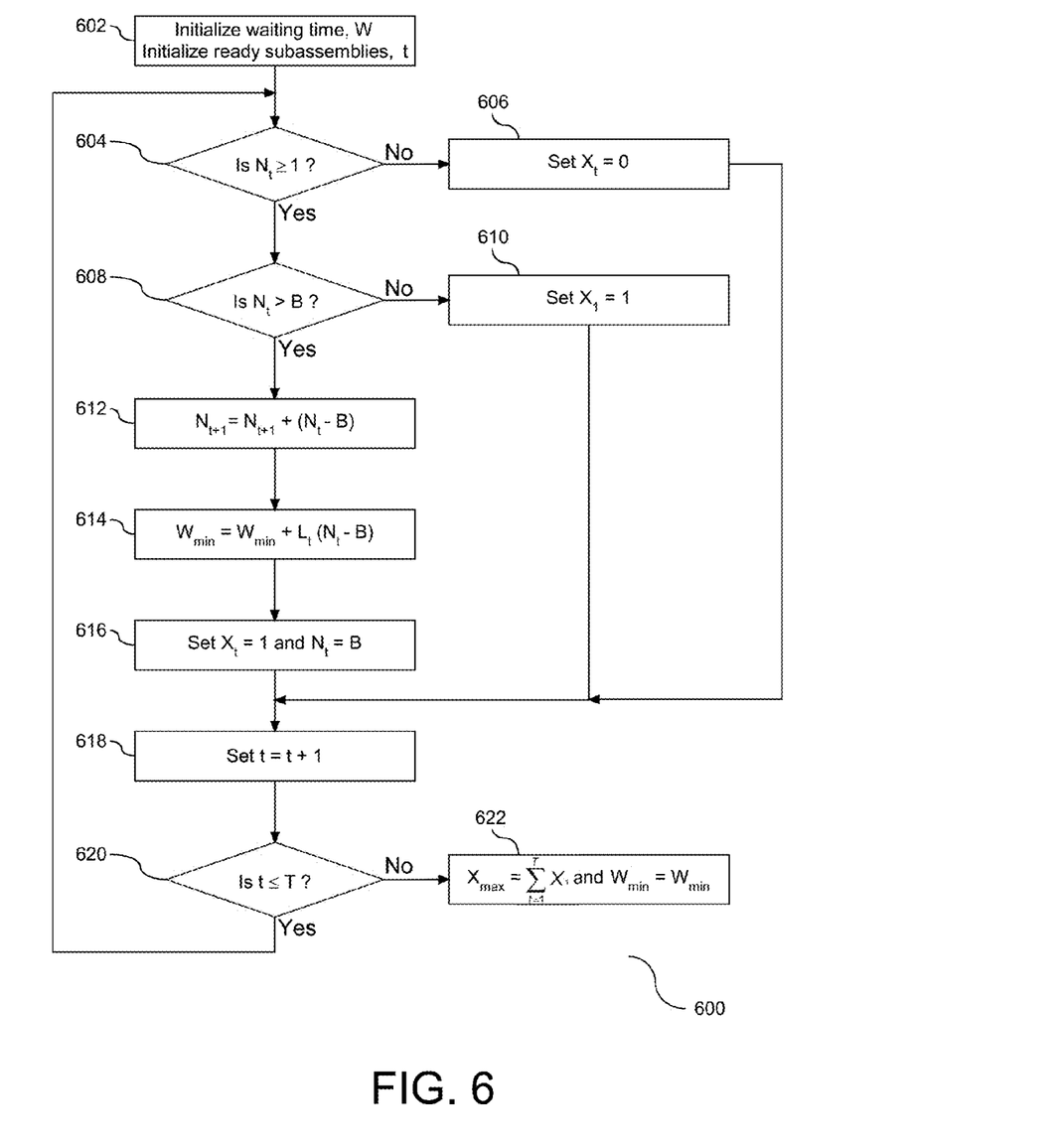
FIG. 6 depicts a flow chart illustrating a process for implementing sensitivity analysis.

One of the elements described herein pertains to movement of subassemblies on a forklift, or an alternative vehicle, for moving the subassemblies. Sensitivity analysis relates to fine tuning the transportation process for minimizing wait time. The goal of the analysis is to minimize the number of products to be transported. Referring to FIG. 6, a flow chart (600) is provided illustrating a process for implementation of the sensitivity analysis. The process starts by initializing the waiting time, W, at the initial time period and for initializing the expected number of subassemblies ready for pick up, t, at the initial time period (602). Thereafter, it is determined if the expected number of subassemblies ready for pick up at period t is set to a value of at least one (604). A negative response to the determination is followed by assigning the transportation movement at the first time period, t=1, to zero (606). However, a positive response to the determination at step (604) is followed by determining if the expected number of subassemblies ready for pick up at period t is greater than B, the maximum batch size, also referred to herein as the maximum number of products that can be transported in one transport (608). A negative response to the determination at step (608) is followed by setting the value of the number of transport movements at the first time period, t=1, to the integer one (610). Accordingly, steps (602)-(610) of the sensitivity analysis pertains to the first time period or time slot.

If the response to the determination at step (608) is positive, then the number of products that can be transported in the next time period is incremented by the quantity set for the next time period and the difference of that value at the maximum batch size (612). Following the increment at step (612), the weighted waiting time is minimized (614). The following formula represents the assessment employed to minimize waiting time:

$$W_{min} = W_{min} + L_t(N_t - B),$$

wherein $N_t$ is the expected number of subassemblies ready for pick up at period t, $L_t$ represents the length of period t, assuming all periods have the same length, and B represents the maximum batch size. Following step (614), the transportation movement $X_t$ is set to the integer one and the variable $N_t$ representing the expected number of subassemblies ready for pick up is set to the value of the maximum batch size (616). Following the settings at steps (606), (610), or (616), the time period is incremented (618). It is then determined if all of the time periods have been evaluated (620). A negative response is followed by a return to step (604). However, a positive response concludes the analysis for the time periods and the maximum number of transportation movements is set to the sum of the transportation movements over the time periods analyzed, with the minimum waiting time set to the value assessed, at step (614), (622). Accordingly, the analysis shown and described herein calculates a minimum waiting time and the maximum number of transportation movements.

The sensitivity analysis shown and described in FIG. 6 embeds an aspect of efficiency into the transportation decisions. There are a plurality of variables, some of which are throttled to attain a steady state with the maximum quantity of subassemblies being transported all while minimizing wait times. Weight and size are factors that affect the analysis. Specifically, transport is affected by both of these limitations. Each transport has a maximum weight that can be accommodated, and at the same time, has a size limit on the transport.

As shown and described in FIGS. 1-6, statistical and mathematical optimization techniques are used to predict completion time of subassemblies in one production line, and develops a dynamic transportation schedule of these subassemblies to the next line. More specifically, as shown, the modelling accounts for improving transportation of parts and products in a manufacturing environment, while taking into consideration transportation cost. In one embodiment, waiting time is another factor that is considered in the evaluation process. More specifically, the cycle time and throughput of production lines is predicted to optimize transportation cost and waiting time.

Figure 7:
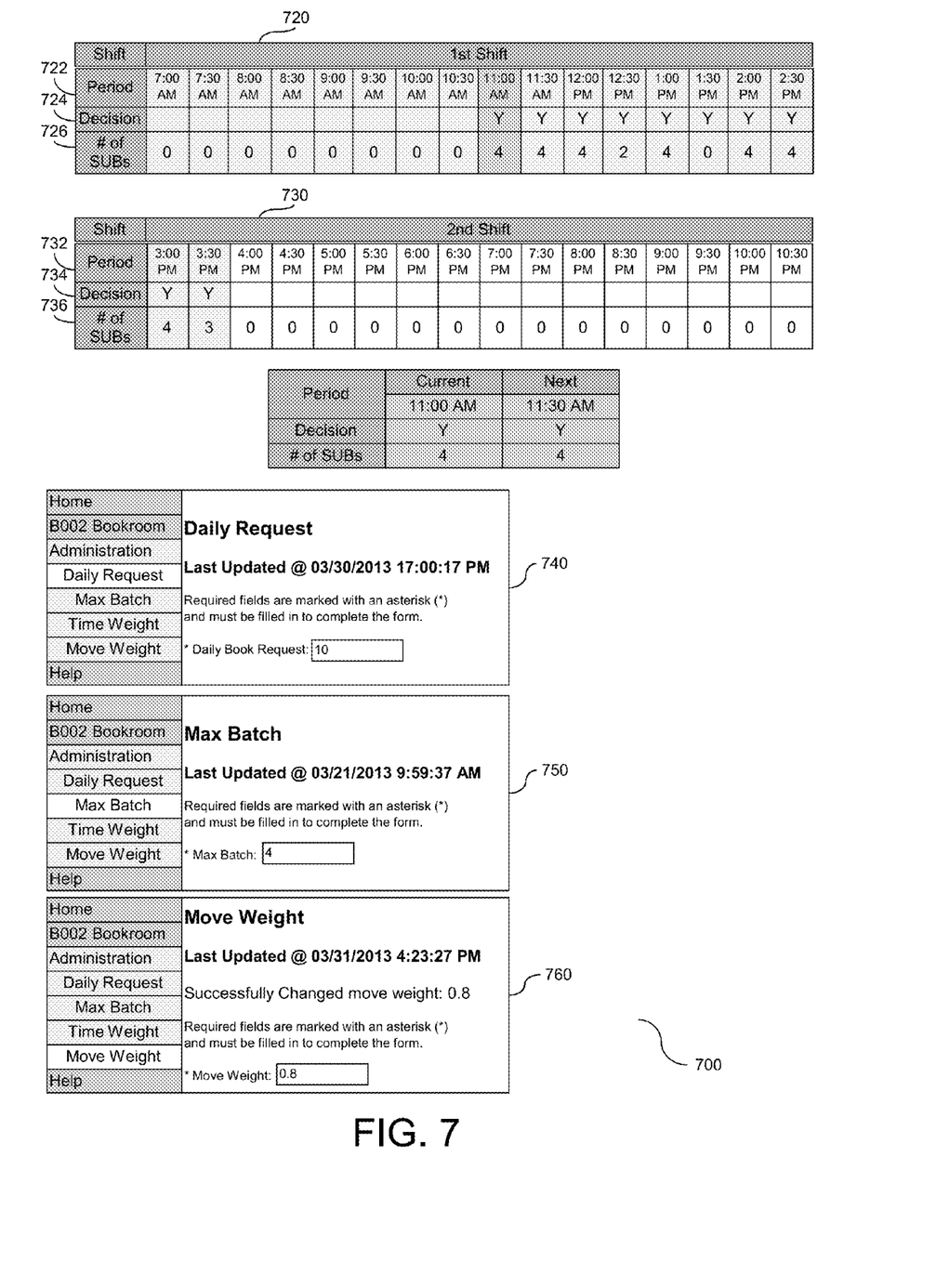
FIG. 7 depicts a block diagram illustrating aspects of the interface, which in one embodiment is referred to as a dashboard.

The optimization aspects shown and described in FIGS. 1-6, may be implemented in a computer readable medium, and in one embodiment with an interface to facilitate and enable interaction with the optimization. Referring to FIG. 7, a block diagram (700) is provided illustrating aspects of the interface, which in one embodiment is referred to as a dashboard. As shown, the interface illustrates movement of subassemblies through manufacturing shifts. More specifically, two shifts are shown, including a first shift (720) and a second shift (730). Each of these shifts are divided into periods (722) and (732), respectively, decisions (724) and (734), respectively, and the number of subassemblies produced per shift (726) and (736), respectively. At the same time, changes to the optimization may be placed through the interface. For example, at (740) a window is provided to insert changes to the daily request, such as amending the number of batches for a particular day, at (750) a window is provided to amend the maximum batch size, i.e. the maximum number of units per batch, and at (760) a window is provided to amend the subassembly weight. The amendments described above may be made on a periodic basis. For example, at (760), the weight of the subassembly may be decreased at the end of a quarter to reflect a change in materials that may or may not require a change in the transportation schedule. Accordingly, the parameters amended via the interface play a role in the processes shown and described in FIGS. 1-6.

Figure 8:
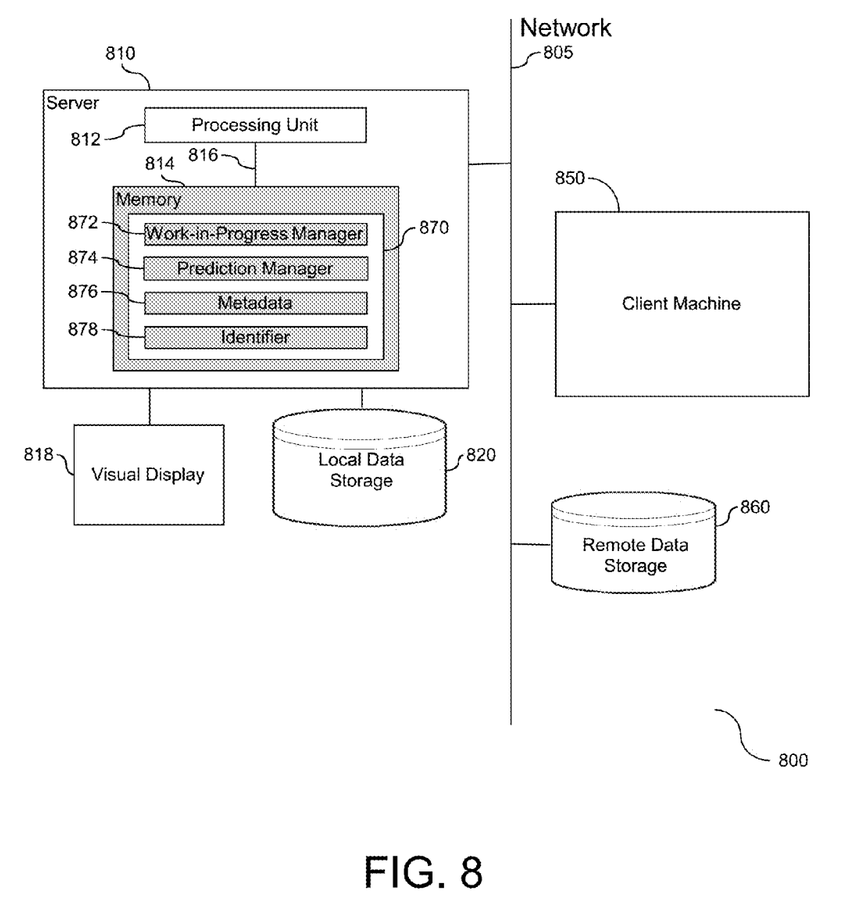
FIG. 8 depicts a block diagram illustrating a system that supports dynamic transfer batch size and real-time internal transportation decision in a build-to-order manufacturing environment.

The processes shown and described above may be embedded in a physical system. With reference to FIG. 8, a block diagram (800) is provided illustrating a system that supports dynamic transfer batch size and real-time internal transportation decision in a build-to-order manufacturing environment. As shown, the system (800) is embedded in a computer system shown with a server (810) having a processing unit (812) in communication with memory (814) across a bus (816), and a visual display (818). The server (810) is in communication with one or more additional machines (850), across a network connection (805). In one embodiment, data storage (860) is provided across the network connection.

Data, including but not limited to, product manufacture data, order processing, transportation, batch size, scheduling, etc., may be captured and stored in local data storage (820) or remote data storage (860). A set of tools (870) are provided to support optimization and decisions in the manufacturing environment. The tools are shown in communication with memory (814) and include, but are not limited to, a work in process (WIP) manager (872), a prediction manager (874), a transportation manager (876), and an optimizer (878). The WIP manager (872) functions to calculate cycle time and WIP for manufacture of a subassembly. More specifically, all product manufacture has a work interval as the time required to provide a single subassembly or multiple subassemblies, with the interval reflecting the quantity of subassemblies that can be manufactured during a shift. In one embodiment, manufacture of subassemblies takes place in at least two separate processes with transportation required to move the product after completion at a first station to a second station for final assembly into a finish product. At the same time, the manufacturing process is dynamic. Orders may be placed while prior orders are being processed and manufactured. Some orders may contain duplicate configurations, while other orders are unique, e.g.

custom configured. To address the flowing nature of manufacture, the prediction manager (874) communicates with the WIP manager (872) to predict the quantity of subassemblies that are ready for ordering and/or manufacturing. Such predictions bring order and predictability into the manufacturing and delivery process so that orders can be delivered to a customer on time.

As explained above, subassemblies commonly require transportation at the completion of the first process to deliver a state of the subassembly to the second process, or in one embodiment any subsequent process. In one embodiment, the first and second processes represent two distinct formatives of manufacture. Similarly, in one embodiment, the first process may represent manufacture and assembly, and the second process may represent packaging and shipment. Regardless of the specific nature of the first and second process, the subassembly is moved between these two processes, also referred to herein as stations of sites. The transportation manager (876) functions to calculate and assess a quantity of subassemblies that are ready for transport, including an associated batch size of subassemblies. More specifically, the transportation manager (876) bases the calculation on the cycle time and WIP, as well as a quantity of predicted orders. The transport size is fixed based on the size and weight of the subassembly, and the capacity of the transport mechanism. In one embodiment, there may be subassemblies from the prior shift that were not transported due to unavailable transport capacity, and the transportation manager (876) accounts for such subassemblies so that they may be transported in a subsequent transport interval.

Finally, the optimizer (878) functions to accommodate and make adjustments to the various factors associated with manufacturing and product assembly. As explained above, there may be an internal transportation factor associated with subassembly manufacture. The optimizer (878) functions to meet a production schedule for product orders while considering the calculated quantity of subassemblies that are ready for transportation. More specifically, the optimizer (878) generates a batch size and a transportation schedule for the actual ordered quantity of subassemblies. In one embodiment, the optimizer (878) transforms one or more parameters to support manufacture of the subassemblies, which in one embodiment includes a real-time batch size of subassemblies. In one embodiment, the optimizer transforms the one or more parameters through a host computer, e.g. server (810). The transformation performed by the optimizer (878) includes applying the real-time batch size to create formatted internal transportation data to the transportation schedule for the actual ordered quantity of subassemblies in real-time. To meet or reduce manufacture cycle time, the optimizer (878) synchronizes the production schedule with the order schedule. More specifically, the optimizer (878) employs a sensitivity analysis, which in one embodiment includes a minimum wait time and a maximum number of batches per transportation movement. To maintain the schedule, the optimizer (878) updates the cycle time and batch size at two separate frequencies. Accordingly, the optimizer (878) addresses real-time factors to bring efficiency into product manufacture and order to ensure timely delivery of the completed subassembly.

The server described above in FIG. 8 has been labeled with one or more tools (870), in the form of managers and an optimizer, to facilitate and support manufacturing decisions. The tools may be implemented in programmable hardware devices such as field programmable gate arrays, programmable array logic, programmable logic devices, or the like. The tools may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of the tools need not be physically located together, but may comprise disparate instructions stored in different locations which, when joined logically together, comprise the tools and achieve the stated purpose of the tool.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 9:
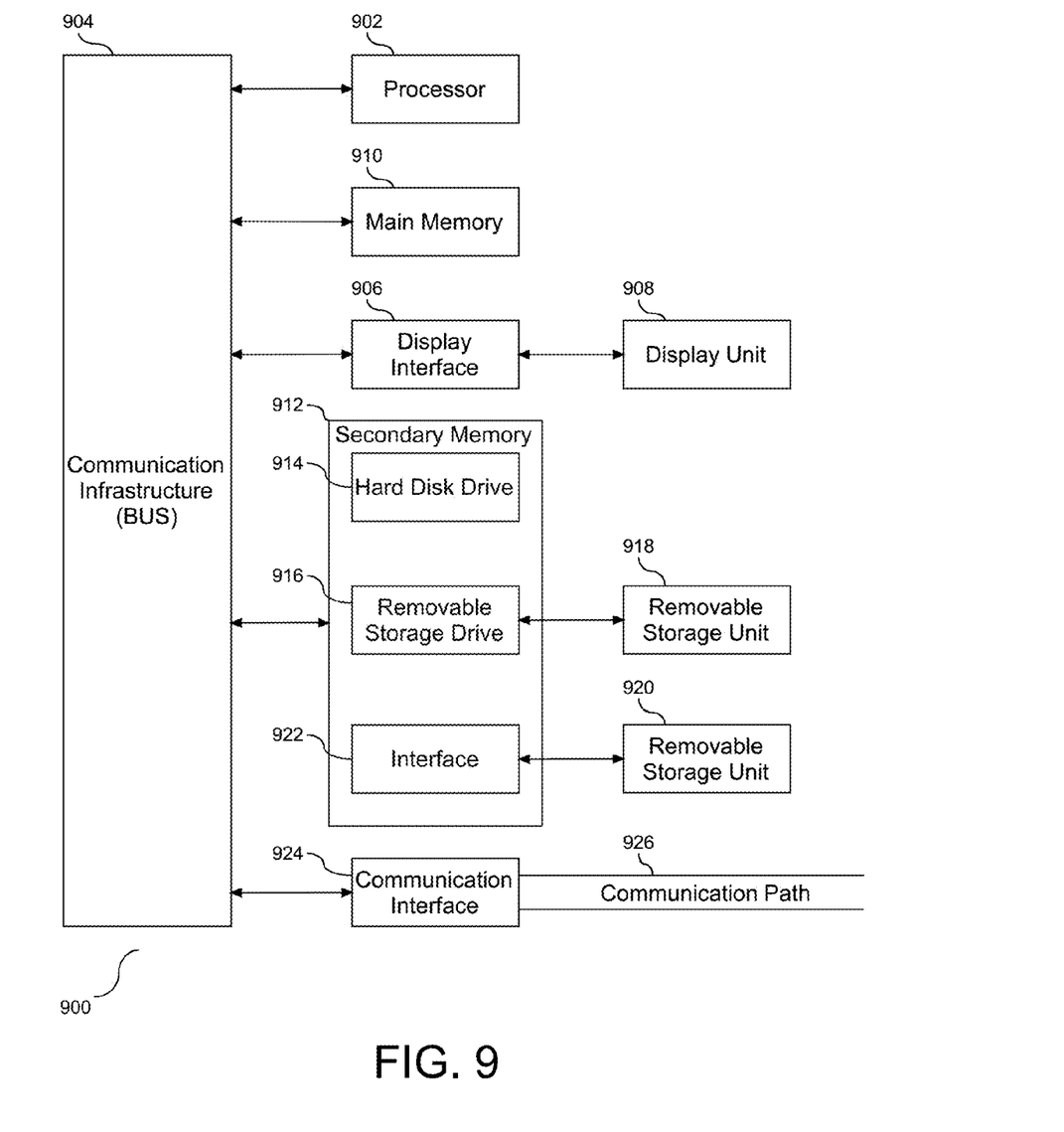
FIG. 9 depicts a block diagram showing a system for implementing an embodiment of the present invention.

Referring now to the block diagram of FIG. 9, additional details are now described with respect to implementing an embodiment of the present invention. The computer system includes one or more processors, such as a processor (902). The processor (902) is connected to a communication infrastructure (904) (e.g., a communications bus, cross-over bar, or network).

The computer system can include a display interface (906) that forwards graphics, text, and other data from the communication infrastructure (904) (or from a frame buffer not shown) for display on a display unit (908). The computer system also includes a main memory (910), preferably random access memory (RAM), and may also include a secondary memory (912). The secondary memory (912) may include, for example, a hard disk drive (914) and/or a removable storage drive (916), representing, for example, a floppy disk drive, a magnetic tape drive, or an optical disk drive. The removable storage drive (916) reads from and/or writes to a removable storage unit (918) in a manner well known to those having ordinary skill in the art. Removable storage unit (918) represents, for example, a floppy disk, a compact disc, a magnetic tape, or an optical disk, etc., which is read by and written to by removable storage drive (916).

In alternative embodiments, the secondary memory (912) may include other similar means for allowing computer programs or other instructions to be loaded into the computer system. Such means may include, for example, a removable storage unit (920) and an interface (922). Examples of such means may include a program package and package interface (such as that found in video game devices), a removable memory chip (such as an EPROM, or PROM) and associated socket, and other removable storage units (920) and interfaces (922) which allow software and data to be transferred from the removable storage unit (920) to the computer system.

The computer system may also include a communications interface (924). Communications interface (924) allows software and data to be transferred between the computer system and external devices. Examples of communications interface (924) may include a modem, a network interface (such as an Ethernet card), a communications port, or a PCMCIA slot and card, etc. Software and data transferred via communications interface (924) is in the form of signals which may be, for example, electronic, electromagnetic, optical, or other signals capable of being received by communications interface (924). These signals are provided to communications interface (924) via a communications path (i.e., channel) (926). This communications path (926) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (910) and secondary memory (912), removable storage drive (916), and a hard disk installed in hard disk drive (914).

Computer programs (also called computer control logic) are stored in main memory (910) and/or secondary memory (912). Computer programs may also be received via a communication interface (924). Such computer programs, when run, enable the computer system to perform the features of the present invention as discussed herein. In particular, the computer programs, when run, enable the processor (902) to perform the features of the computer system. Accordingly, such computer programs represent controllers of the computer system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/acts specified in the flowcharts and/or block diagrams block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowcharts and/or block diagrams block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The implementation of dynamic product order support combines batch size and transportation considerations, with the improvement lending itself to manufacturing efficiency. Specifically, internal manufacturing delays are identified and minimized based on consideration of one or more mitigation strategies and their effectiveness. Accordingly, the optimization enables and supports dynamic adjustment to the ordering and manufacturing processes to meet a production schedule.

It will be appreciated that, although specific embodiments of the invention have been described herein for purposes of illustration, various modifications may be made without departing from the spirit and scope of the invention. In particular, the subassembly manufacture may have preconfigured specification(s), or in one embodiment may be custom configured. The transportation schedule may grow in complexity with custom assembly with different components requiring delivery to and from different locations. The optimizer functions to accommodate and configure scheduling based on increased complexity. Accordingly, the scope of protection of this invention is limited only by the following claims and their equivalents.

What is claimed is:

1. A method comprising:
dynamically configuring a manufacture of subassemblies, including:
calculating cycle time and work in progress for the manufacture of the subassemblies;
predicting a quantity of subassemblies ready for on time delivery;
calculating the quantity of subassemblies ready for transportation between two or more production lines for the manufacture of the subassemblies, the quantity includes an associated batch size for each transportation, based on the calculated cycle time and work in progress and the predicted order quantity; and
optimizing the cycle time by synchronizing a production schedule with an order schedule, the synchronization including:
transforming, through a host computer, at least one parameter for supporting the manufacture of the subassemblies, including generating a real-time batch size for each transportation, for meeting the production schedule for an actual ordering quantity from the order schedule based on the calculated quantity of subassemblies ready for transportation between the production lines, the transformation including generating a transportation schedule for the actual ordered quantities of subassemblies in real-time including applying the real-time batch size to create formatted internal transportation data; and
moving the subassemblies between production lines according to the real-time batch size and the transportation schedule including the formatted internal transportation data.

2. The method of claim 1, further comprising reducing cycle time for manufacture of the subassembly based on the optimization of the cycle time.

3. The method of claim 2, further comprising analyzing sensitivity of the optimization of the cycle time, including calculating a minimum waiting time and a maximum number of transportation movements.

4. The method of claim 2, further comprising updating the cycle time at a first frequency and generating the real-time batch size at a second frequency, wherein the first and second frequencies are different.

5. The method of claim 1, wherein a total quantity of subassemblies for any time period is the combination of the quantity of predicted subassemblies and a second quantity of subassemblies left from a previous period.

6. A computer program product for dynamically assessing a batch size for a product order, the computer program product comprising a computer readable storage device having program code embodied therewith, the program code executable by a processing unit to:
dynamically configure a manufacture of subassemblies including program code to:
calculate cycle time and work in progress for the manufacture of the subassemblies;

predict a quantity of subassemblies ready for on time delivery;

calculate the quantity of subassemblies ready for transportation between two or more production lines for the manufacture of the subassemblies, the quantity including an associated batch size for each transportation, based on the calculated cycle time and work in progress and the predicted order quantity;

optimize the cycle time by synchronization of a production schedule with an order schedule, the synchronization including program code to:

transform, through a host computer, at least one parameter to support the manufacture of the subassemblies, including to generate a real-time batch size for each transportation, for meeting the production schedule for an actual ordering quantity from the order schedule based on the calculated quantity of subassemblies ready for transportation between the production lines, the transformation including to generate a transportation schedule for the actual ordered quantities of subassemblies in real-time including application of the real-time batch size to create formatted internal transportation data; and move the subassemblies between production lines according to the real-time batch size and the transportation schedule including the formatted internal transportation data.

7. The computer program product of claim 6, further comprising program code to reduce cycle time for manufacture of the subassembly based on the optimization of the cycle time.

8. The computer program product of claim 7, further comprising program code to analyze sensitivity of the optimization of the cycle time, including calculating a minimum waiting time and a maximum number of transportation movements.

9. The computer program product of claim 7, further comprising program code to update the cycle time at a first frequency and generate the real-time batch size at a second frequency, wherein the first and second frequencies are different.

10. The computer program product of claim 6, wherein a total quantity of subassemblies for any time period is the combination of the quantity of predicted subassemblies and a second quantity of subassemblies left from a previous period.

11. A system comprising:
a processing unit in communication with memory;
tools in communication with and executable by the processing unit to dynamically configure a manufacture of subassemblies, the tools comprising:
  a work in progress manager to calculate cycle time and work in progress for the manufacture of the subassemblies;
  a prediction manager in communication with the work in progress manager, the prediction manager to predict a quantity of subassemblies ready for on time delivery;
  a transportation manager to calculate the quantity of subassemblies ready for transportation between two or more production lines for the manufacture of the subassemblies based on the calculated cycle time and work in progress and the predicted order quantity;
  an optimizer to transform, through a host computer, at least one parameter to support the manufacture of the subassemblies, including to generate a real-time batch size for each transportation, for meeting the production schedule for an actual ordering quantity from the order schedule based on the calculated quantity of subassemblies ready for transportation between the production lines, the optimizer to generate a transportation schedule for the actual ordered quantities of subassemblies in real-time including to apply the real-time batch size to create formatted transportation data; and
  a transport in communication with the tools, the transport to move the subassemblies between production lines according to the real-time batch size and the transportation schedule including the formatted internal transportation data.

12. The system of claim 11, further comprising the optimizer to reduce cycle time for manufacture of the subassembly based on the optimization of the cycle times.

13. The system of claim 12, further comprising the optimizer to analyze sensitivity of the optimization of the cycle time, including the optimizer to calculate a minimum waiting time and a maximum number of transportation movements.

14. The system of claim 12, further comprising the optimizer to update the cycle time at a first frequency and generate the real-time batch size at a second frequency, wherein the first and second frequencies are different.

15. The system of claim 11, wherein a total quantity of subassemblies for any time period is the combination of the quantity of predicted subassemblies and a second quantity of subassemblies left from a previous period.

\* \* \* \* \*